(12) United States Patent
Koski

(10) Patent No.: US 11,362,350 B2
(45) Date of Patent: Jun. 14, 2022

(54) FUEL CELL SYSTEM AND A METHOD AND APPARATUS FOR STARTING A FUEL CELL STACK

(71) Applicant: Teknologian tutkimuskeskus VTT Oy, Espoo (FI)

(72) Inventor: Pauli Koski, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 17/058,674

(22) PCT Filed: Jun. 26, 2019

(86) PCT No.: PCT/FI2019/050501
§ 371 (c)(1),
(2) Date: Nov. 25, 2020

(87) PCT Pub. No.: WO2020/002773
PCT Pub. Date: Jan. 2, 2020

(65) Prior Publication Data
US 2021/0210776 A1    Jul. 8, 2021

(30) Foreign Application Priority Data
Jun. 29, 2018  (FI) .................................. 20185606

(51) Int. Cl.
*H01M 8/04*      (2016.01)
*H01M 8/04223*   (2016.01)
(Continued)

(52) U.S. Cl.
CPC ... *H01M 8/04268* (2013.01); *H01M 8/04029* (2013.01); *H01M 8/0432* (2013.01);
(Continued)

(58) Field of Classification Search
CPC ......... H01M 8/04268; H01M 8/04225; H01M 8/04302; H01M 8/04029; H01M 8/04037
See application file for complete search history.

(56) References Cited

U.S. PATENT DOCUMENTS 8,862,305 B1   10/2014  Kim et al.
2008/0187802 A1  8/2008  Andreas-Schott et al.
(Continued)

FOREIGN PATENT DOCUMENTS

DE    102014009771 A1   1/2016
WO    WO2018113750 A1   6/2018

*Primary Examiner* — Olatunji A Godo
(74) *Attorney, Agent, or Firm* — Laine IP Oy

(57) ABSTRACT

The invention concerns fuel cell systems and methods for converting chemical energy of a fuel containing hydrogen into electricity. According to the invention, a fuel cell stack is provided having at least one anode and one cathode separated by a proton-exchange membrane. A fuel transport circuit feeds fuel to the fuel cell stack, and a temperature control system is adapted to control the temperature of the fuel cell stack by circulating a coolant medium through said fuel cell stack. The temperature control system includes a pump for circulating the coolant medium, a heater unit connected to a coolant transport circuit for heating the coolant with a PTC heater, a heat radiation unit connected to the coolant transport circuit for removing excess heat, and a temperature sensor. In response to a startup condition of the fuel cell stack, a controller is adapted to read a temperature signal indicative of the fuel cell stack temperature, to bypass the heat radiation unit, if the fuel cell stack temperature is below a first predetermined value, and to connect electric power generated by said fuel cell stack to be started-up to said PTC heater.

3 Claims, 3 Drawing Sheets

(51) Int. Cl.
*H01M 8/04225* (2016.01)
*H01M 8/04302* (2016.01)
*H01M 8/04029* (2016.01)
*H01M 8/04007* (2016.01)
*H01M 8/0432* (2016.01)
*H01M 8/04701* (2016.01)
*H01M 8/04746* (2016.01)

(52) U.S. Cl.
CPC ... *H01M 8/04037* (2013.01); *H01M 8/04067* (2013.01); *H01M 8/04225* (2016.02); *H01M 8/04302* (2016.02); *H01M 8/04723* (2013.01); *H01M 8/04768* (2013.01)

(56) References Cited

U.S. PATENT DOCUMENTS

| | | |
|---|---|---|
| 2009/0272727 A1 | 11/2009 | Han |
| 2010/0261079 A1* | 10/2010 | Kells ................ H01M 8/04126 429/429 |
| 2018/0114998 A1 | 4/2018 | Kwon et al. |

* cited by examiner

FUEL CELL SYSTEM AND A METHOD AND APPARATUS FOR STARTING A FUEL CELL STACK

FIELD OF THE INVENTION

The invention relates to Proton-exchange membrane (PEM) fuel cells fuel cell systems, in particular to cold-start systems for fuel cells using PTC heaters.

ACKNOWLEDGEMENT

The work leading to this invention has received funding from the European Union's Seventh Framework Programme (FP7/2007-2013) for the Fuel Cells and Hydrogen Joint Technology Initiative under grant agreement n° 621218.

BACKGROUND OF THE INVENTION

Proton-exchange membrane fuel cells, also known as polymer electrolyte membrane fuel cells (PEMFC), are a type of fuel cell being developed mainly for transport applications, as well as for stationary fuel-cell applications and portable fuel-cell applications. Their distinguishing features include lower temperature ranges (50 to 100° C.) and a special proton-conducting polymer electrolyte membrane.

Heating up the PEMFC stack during cold start-ups is usually done by relying on external power and heating up the stack and/or coolant with electrical heaters. This can be combined with operating the pre-dried stack with near short-circuit conditions to convert most of the potential energy of the fuel directly to heat instead of electricity. Prior art such as disclosed in U.S. Pat. No. 8,862,305, US20080187802 and US 20090272727 show solutions where the electricity generated by the fuel cell is used to heat itself up in cold start conditions by the use of PTC (Positive Temperature Coefficient) heaters attached to the stack.

The problem is how to regulate the "near short-circuit" conditions without damaging the stack. The control of the stack at near short-circuit conditions is problematic because drawing too much current may overheat the electrical contacts and cause melting of the components of the fuel cell. Another problem is high temperature differences between a liquid coolant and the stack during start-up conditions, which may cause leakages and stack failures, Altering stack design and/or incorporating multiple internal or external electrical heaters, for the purpose of coping with cold start-up conditions, increases the price and complexity of the system.

There is thus a need for an improved PEMFC cold-start regulating mechanism that may be applied independently of the stack design, which provides for easier control of the fuel cell stack heat-up to the desired temperature, and which eliminates the risk of short-circuit damages in the fuel cell system.

SUMMARY OF THE INVENTION

According to a first aspect of the invention, a fuel cell system for converting chemical energy of a fuel containing hydrogen into electricity is provided. The inventive system comprises
  a fuel cell stack comprising at least one anode and one cathode separated by a proton-exchange membrane;
  a fuel transport circuit for feeding fuel to said fuel cell stack;
  a temperature control system comprising a coolant transport circuit and adapted to control the temperature of said fuel cell stack by circulating a coolant medium through said fuel cell stack, including:
    a pump for circulating said coolant medium in said coolant transport circuit;
    a heater unit connected to said coolant transport circuit for heating said coolant medium with a PTC heater;
    a heat radiation unit connected to said coolant transport circuit for removing excess heat from said fuel cell stack;
    at least one temperature sensor;
  wherein said fuel cell system includes a controller adapted to, in response to a startup condition of said fuel cell stack, where said fuel transport circuit will deliver fuel to said fuel cell stack,
    read a temperature signal indicative of the fuel cell stack temperature from said at least one temperature sensor;
    bypass said heat radiation unit in said coolant transport circuit, if the fuel cell stack temperature is below a first predetermined value, and to
    connect electric power generated by said fuel cell stack to be started-up to said PTC heater.

According to a second aspect of the invention, a method for starting a fuel cell system is provided. The inventive method comprises the steps of providing:
  a fuel cell stack comprising at least one anode and one cathode separated by a proton-exchange membrane, and a fuel transport circuit for feeding fuel to said fuel cell stack;
  a temperature control system comprising a coolant transport circuit and adapted to control the temperature of said fuel cell stack by circulating a coolant medium through said fuel cell stack, including:
    a pump for circulating said coolant medium in said coolant transport circuit;
    a heater unit for heating said coolant medium with a PTC heater;
    a heat radiation unit connected to said coolant transport circuit for removing excess heat from said fuel cell stack;
    at least one temperature sensor;
  wherein the method comprises the further steps performed by said controller, in response to a startup condition of said fuel cell stack, where said fuel transport circuit is delivering fuel to said fuel cell stack,
    reading a temperature signal indicative of the fuel cell stack temperature from said at least one temperature sensor;
    bypassing said heat radiation unit in said coolant transport circuit, if the fuel cell stack temperature is below a first predetermined value, and
    connecting electric power generated by said fuel cell stack to be started-up to said PTC heater.

According to a third aspect of the invention, an apparatus is provided, which comprises a fuel cell stack for converting chemical energy of a fuel containing hydrogen into electricity, at least one processing core, at least one memory including computer program code. The at least one memory and the computer program code being configured to, with the at least one processing core, cause the apparatus at least to:
    read from at least one temperature sensor a temperature signal indicative of the temperature of said fuel cell stack;
    bypass a heat radiation unit from a coolant transport circuit for said fuel cell stack, if the fuel cell stack is set to a startup condition and the temperature in said fuel cell stack is below a first predetermined value, connect electric power generated by said started-up fuel cell stack to a PTC heater capable of heating said coolant medium in said coolant transport circuit.

The fuel may within the context of the invention be a liquid or a gas. Likewise, also the coolant medium may be a liquid or a gas.

In some embodiments of the invention, the heat radiation unit is bypassed by operating at least one valve that allows the coolant to flow to the heater, without passing through said heat radiation unit. In other words, the coolant to flow to the heater is allowed and the coolant flow to through said heat radiation unit is stopped.

In some embodiments the controller receiving a temperature signal from said at least one sensor indicating that the fuel cell stack temperature or the coolant temperature has reached a second predetermined value, is adapted to connect electric power to an output for external consumption. The output of an inventive PEMFC fuel cell system may be connected to any type of load, from a vehicle motor to a local power grid, for example.

In some embodiments the controller receiving a temperature signal from said at least one sensor indicating that the fuel cell stack temperature or the coolant temperature has reached a third predetermined value, is adapted to disconnect said PTC heater from said electric power.

In some embodiments the controller receiving a temperature signal from said at least one sensor indicating that the fuel cell stack temperature or the coolant temperature has reached a fourth predetermined value, is adapted to connect said heat radiation unit to said coolant transport circuit by operating at least one valve that directs the coolant flow to said heat radiation unit.

During PEMFC system cold-start, the stack is operated near short circuit conditions, where most of the potential energy of the fuel and oxidant are directly employed to heat the stack, but some resulting electrical power is used in a liquid-cooled PTC-heater that heats up the coolant circuit, i.e. the electrical power is transferred to PTC-resistors to heat-up the coolant. This method allows the startup by effectively transferring heat to the stack and coolant, which are the most critical parts to heat up for a successful cold start-up. The PTC-elements intrinsically regulate the current drawn from the stack, avoiding overheating problems from true short-circuiting. As the stack is not in a true short-circuit condition, damage due to high short circuit currents causing overheating in the current collectors of the stack are prevented.

The present invention offer considerable benefits. First, a PTC heater is only one additional component to the coolant circuit, the regulation being done by the existing coolant system. Secondly, the inventive PTC heater safely prevents any overheating of the stack current collection circuit, while maintaining it near the short circuit conditions, where most of the fuel energy is converted to heat the stack. Thirdly, the method does not require any modifications for the stack itself, allowing easy incorporation to existing system designs.

When using liquid cooled PTC resistors, the thermal power is conducted to the coolant liquid, and the resistance of the heater is in principle regulated by the coolant pump that feeds cold coolant through the heater. In this way the heat is also transferred where it is needed at most, as the coolant forms a significant part of the system heat capacity, which needs to be heated to favorable operating temperatures fast enough.

In order to reduce the amount of heat capacity during start-up, the radiator is according to the invention temporarily bypassed from the coolant circuit by solenoid valves, etc.

PTC heaters can be built as a self-regulating thermistor, in which the resistance increases exponentially when the resistor temperature heats close to its characteristic shutoff value. With typical PTC rubber heaters, the characteristic temperature is usually chosen to be 60-80° C., which is close to the PEMFC operating temperature.

BRIEF DESCRIPTION OF THE DRAWINGS

The embodiments of the invention is in the following described in more detail by making reference to the attached drawings, in which.

DETAILED DESCRIPTION OF EMBODIMENTS

Figure 1:
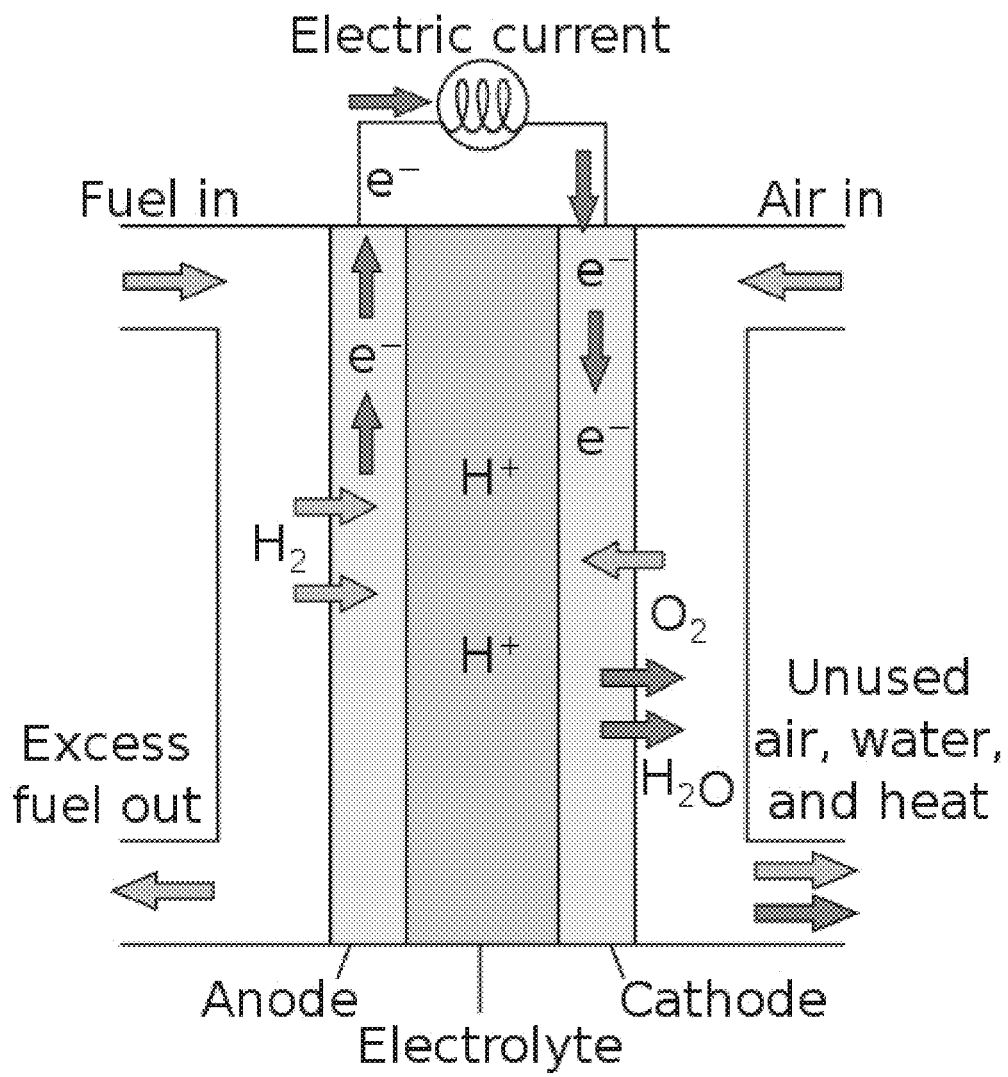
FIG. 1 shows a schematic representation of a fuel cell that can be used in the present invention.

In FIG. 1, a schematic representation of a fuel cell that can be used in the present invention is shown.

A proton exchange membrane fuel cell transforms the chemical energy liberated during the electrochemical reaction of hydrogen and oxygen to electrical energy. A stream of hydrogen is delivered to the anode side. At the anode side hydrogen gas is catalytically split into protons and electrons. This hydrogen oxidation reaction at the anode is represented by the formula $H_2 \rightarrow 2H^+ + 2e^-$. In the case of a liquid fuel, an exemplary formula for direct methanol is $CH_3OH + H_2O \rightarrow 6H^+ + 6e^- + CO_2$.

The protons then conduct through the polymer electrolyte membrane to the cathode side, while electrons travel along an external load circuit, thus creating a current output of the fuel cell. Meanwhile, a stream of oxygen is delivered to the cathode side, where the oxygen molecules react with the protons conducted through the polymer electrolyte membrane and the electrons returning through the external circuit, to form water molecules. This oxygen reduction reaction is represented by the formula: $\frac{1}{2}O_2 + 2H^+ + 2e^- \rightarrow H_2O$.

Figure 2:
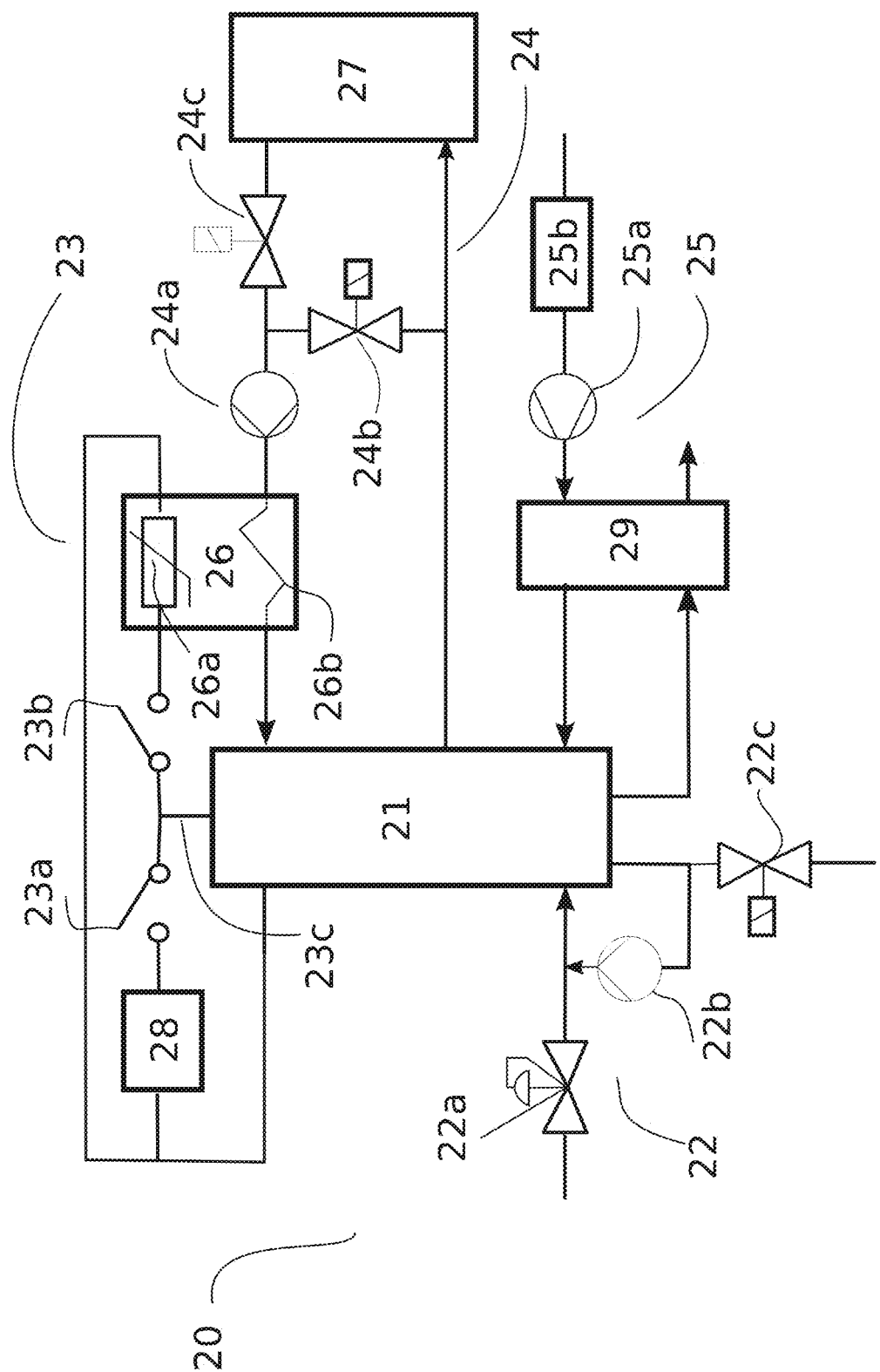
FIG. 2 shows a fuel cell system according to the present invention.

In FIG. 2 is shown a schematic representation of a fuel cell system 20 according to the present invention. The main components and subsystems are the PEMFC stack 21, its fuel supply 22, the electrical power consuming load 28 and its electrical power circuit 23, the cooling system 24 with a radiator 27, and a humidifier 29 with its related subsystem 25. The load 28 may, apart from a motor or other power consuming device to be driven by the stack, also a local power line or power grid, for example.

The fuel supply subsystem 22 consists in an exemplary embodiment of the invention of a hydrogen supply valve 22a with a pressure regulator, a circulation pump 22b and a purge valve 22c with an actuator for draining water and expelling diluted hydrogen out of the system. Also other fuel supply systems may be used, with or without circulation and/or employing fuel ejectors, etc.

The electrical power subsystem 23 consists of the load 28, which may in some embodiments be an electric vehicle engine for example, a first breaker 23a for connecting and disconnecting the load 28 to the power output 23c of the fuel cell 21, and a second breaker 23b for connecting and disconnecting the PTC heater element 26a on and off. The load 28 may include a battery (not shown) which may be coupled to provide power for the stack start-up.

The cooling subsystem 24 consists of a heat dissipating device 27, such as a radiator and/or a fan, a coolant pump 24*a* and coolant bypass valves 24*b*, 24*c* with actuators. Instead of two valves and without departing from the present invention, a three-way valve may be used, or any solution for diverting an input flow of coolant from one output path and allowing such flow to another. The coolant circuit passes through a heater 26, where a coil 26*b* or some other coolant fluid carrying vessel can pick up heat from the PTC heater 26*a* if it is switched on.

Finally, the humidifier subsystem 25 consists of a humidifier 29, an air compressor 25*a* and a filter 25*b*. The humidifier 29 provide heat and humidity to the incoming oxidant or hydrogen fuel stream of the fuel cell 21. Correct humidification ensures that during operation the membrane proton conductivity and the system overall efficiency stays high. When the fuel cell 21 is stopped, filtered air is blown into the fuel cell to dry it, and the air return path to the humidifier carries the moisture out of the fuel cell. Air can also be arranged to be blown from the compressor 25*a* directly into the fuel cell 21, i.e. bypassing the humidifier 29, to facilitate rapid drying. Humidity should be removed from the membrane in order to allow it to be operated at low conductivity/efficiency mode during the next start-up. Removing excess water also improves membrane lifetime over freeze/thaw cycling.

The inventive a fuel cell system 20 of FIG. 2 is operated in cold, such as in temperatures below 0° C. as follows:

The system 20 is initiated by starting fuel and reactant flows in subsystem 22. In one embodiment, the coolant valve 24*c* is closed and the coolant bypass valve 24*b* is open, thus eliminating the radiator from the coolant circuit. The coolant pump 24*a* is started at slow speed, and the contactor 23*b* to the PTC heater is connected. Contactor 23*a* remains open. By adjusting the speed (revs/min, etc.) of the coolant pump 24*a*, the heating power of the PTC heater 26 may be regulated, e.g. in order to assist in controlling the short-circuit condition of the stack.

When the reactions in fuel cell stack 21 have started, current will flow through the PTC-heater 26*a*. The stack potential is preferably kept low, which turns most of the fuel/oxidant energy to heat inside the stack. While the stack bipolar plates start a rapid heating, a small fraction of the power produced is lead as electricity from the output 23*c* through contactor 23*b* to heat the coolant system 23 with the heater 26.

Once the stack 21 and the coolant liquid in subsystem 23 is heated above the freezing point, to a temperature of 40° C. for example, the current from the power output 23*c* is directed to the external load 28 by closing contactor 23*a*, thus supplying net power out of the system. The coolant flow is directed to the radiator by closing valve 24*b* and opening valve 24*c*. This may be done when the operation temperature has reached the nominal value of 60-80° C., for example. Contactor 23*b* may be opened earlier, opened at the same time, or be kept closed, depending on what is considered as an optimal heater performance given the conditions under which the fuel cell is operated, and design considerations in the control system of the fuel cell 21.

If the cold-condition sensing temperature (first predetermined temperature) T1 is 0° C., for example, a second predetermined temperature T2, when electric power is connected to the external load 28 by operating contactor 23*a*. T2 may be 40° C., for example. A third predetermined temperature T3 may be 60° C., for example, when the PTC heater is disconnected from electric power by opening contactor 23*b*. A fourth predetermined temperature T4 may be 60-80° C., for example, when a valve is operated to reconnect the coolant flow to the heat radiation unit.

In some embodiments T2=T3=T4, for example. In some embodiments T2<T3<T4, and in some embodiments T2=T3<T4, for example. The choice of a triggering temperature is also dictated by design considerations of the load, such as requirements of a quick startup process in a vehicle.

In some embodiments, an operating temperature in the fuel cell stack above 100° C. may be used, rendering the water byproduct (see FIG. 1) of the oxygen reduction reaction to be steam. This may make water management less critical in stack and system design.

Shutdown of the fuel cell does not differ from normal operation of fuel cell stacks, where drying of the stack and membrane at shutdown is facilitated.

Figure 3:
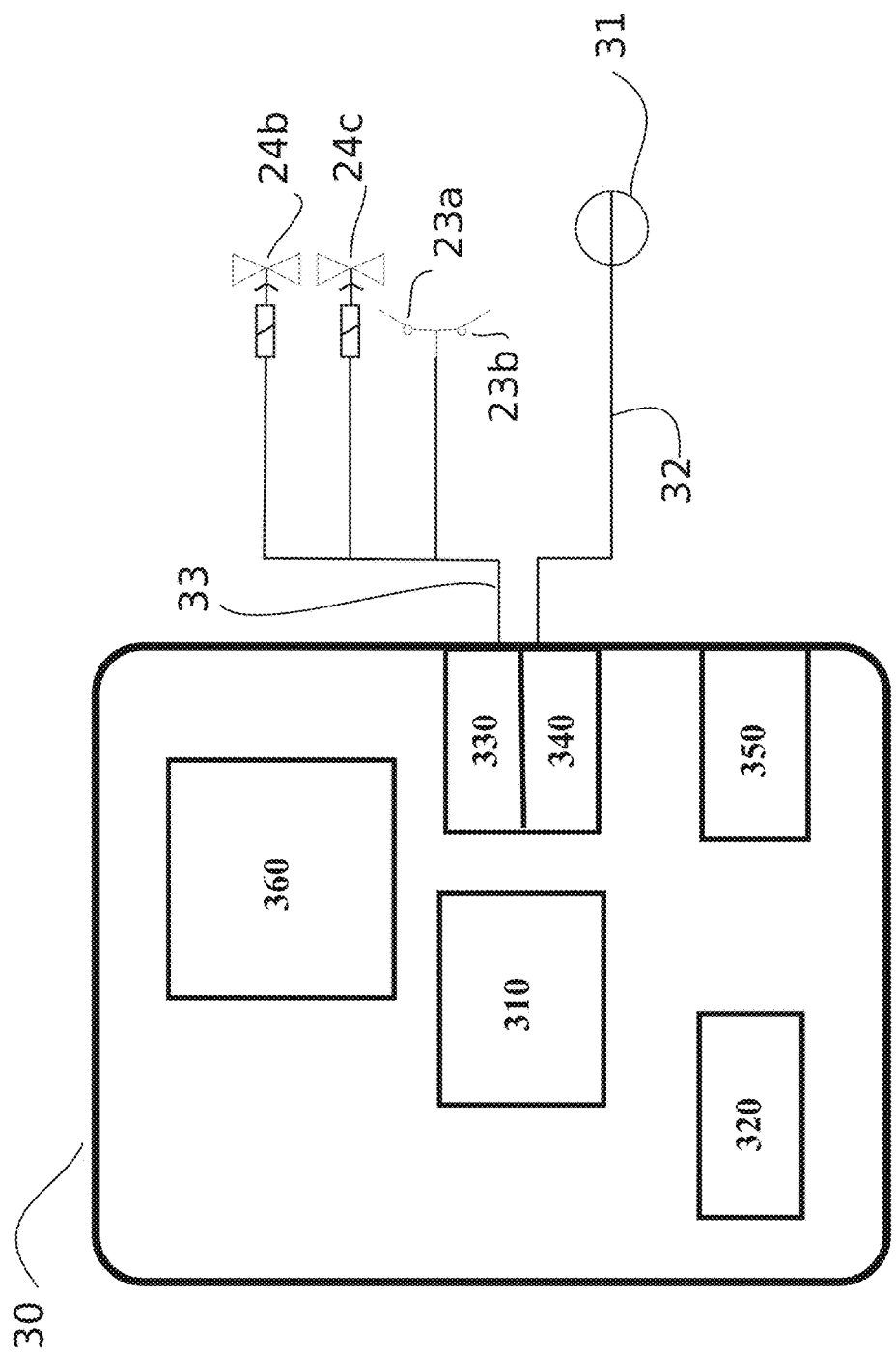
FIG. 3 shows a control system for a fuel cell system according to the present invention.

In FIG. 3 is shown a schematic view an example of a control system capable of supporting at least some embodiments of the present invention, i.e. for controlling the start-up of an inventive fuel cell system as shown in FIG. 2. It comprises a computing device 30 fitted with a suitable process control program, which receives as an input sensing signals from one or more temperature sensors 31 via a line 32. The computing device 30 produces output control signals on signal bus 33 to operate the actuators of valves 24*b*, 24*c*, and the contactors 23*a* and 23*b*, according to the procedure explained in connection with FIG. 2.

The computing device 30 may be a general purpose computer or a dedicated computer, such as a computing unit based on a microprocessor or a microcontroller. Comprised in computing device 30 is a processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in computing device 30. Processor 310 may be means for performing method steps in computing device 30. Processor 310 may be configured, at least in part by computer instructions, to perform actions.

Computing device 30 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and computing device 30 overall is configured to run under the direction of processor 310 using computer instructions from memory 320, processor 310 and/or its at least one processing core may be considered to be configured to perform said certain actions.

Computing device 30 may comprise a transmitter 330. Computing device 30 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Transmitter 330 may be arranged to output information from processor 310, via electrical leads internal to computing device 30, to the actuators of valves 24b, 24c, and the contactors 23a and 23b, as explained. Such a transmitter may use a serial or parallel bus 33. Likewise the receiver 340 may be arranged to receive information in processor 310, via electrical leads internal to computing device 30, from one or more temperature sensors 31 and/or other sensors via a serial or parallel bus 32.

Computing device 30 may also comprise a near-field communication, NFC, transceiver 350. NFC transceiver 350 may support at least one NFC technology, such as NFC, Bluetooth, Wibree or similar technologies, and be used to communicate with actuators, contactors and sensors mentioned above in parallel or instead of other wireless or fixed communication means.

Computing device 30 may comprise user interface 360. User interface (UI) 360 may comprise at least one of a display, a keyboard, a touchscreen. A user may be able to operate computing device 30 via UI 360, for example to manage digital files stored in memory 320 or on a cloud accessible via transmitter 330 and receiver 340, or via NFC transceiver 350.

Computing device 30 may comprise further devices not illustrated in FIG. 3. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. A fuel cell system for converting chemical energy of a fuel containing hydrogen into electricity, comprising:
   a fuel cell stack comprising at least one anode and one cathode separated by a proton-exchange membrane;
   a fuel transport circuit for feeding fuel to said fuel cell stack; and
   a temperature control system comprising a coolant transport circuit and adapted to control the temperature of said fuel cell stack by circulating a coolant medium through said fuel cell stack, the temperature control system further comprising:
      a pump for circulating said coolant medium in said coolant transport circuit;
      a heater unit connected to said coolant transport circuit for heating said coolant medium circulating through said fuel cell stack with a PTC heater;
      a heat radiation unit connected to said coolant transport circuit for removing excess heat from said fuel cell stack; and
      at least one temperature sensor;
   wherein said fuel cell system further comprises a controller adapted to, in response to a startup condition of said fuel cell stack;
   read temperature signals indicative of the fuel cell stack temperature from said at least one temperature sensor; and
   bypass said heat radiation unit in said coolant transport circuit by operating at least one valve in said coolant transport circuit to allow the coolant medium to flow to said heater unit and to stop flow of the coolant medium to said heat radiation unit and connect electric power generated by said fuel cell stack to said PTC heater upon receiving temperature signals from said at least one sensor indicating that the fuel cell stack is below a first predetermined value T1, and upon receiving temperature signals from said at least one sensor indicating that the fuel cell stack or the coolant medium has reached a predetermined second T2, a third T3, and a fourth T4 temperature, wherein $T2 \leq T3 \leq T4$, to:
connect electric power generated by said fuel cell stack to a power output for external consumption at T2,
disconnect said PTC heater from said electric power at T3, and
connect said heat radiation unit to said coolant transport circuit by operating at least one valve that directs the coolant medium flow to said heat radiation unit at T4.

2. A method for starting a fuel cell system for converting chemical energy of a fuel containing hydrogen into electricity, the method comprising the steps of providing:
a fuel cell stack comprising at least one anode and one cathode separated by a proton-exchange membrane, and a fuel transport circuit for feeding fuel to said fuel cell stack; and
a temperature control system comprising a coolant transport circuit adapted to control the temperature of said fuel cell stack by circulating a coolant medium through said fuel cell stack, the temperature control system further comprising:
a pump for circulating said coolant medium in said coolant transport circuit;
a heater unit connected to said coolant transport circuit for heating said coolant medium circulating through said fuel cell stack with a PTC heater;
a heat radiation unit connected to said coolant transport circuit for removing excess heat from said fuel cell stack; and
at least one temperature sensor;
wherein in response to a startup condition of said fuel cell stack, where said fuel transport circuit is delivering fuel to said fuel cell stack, the method comprises at least the further steps performed by said controller of:
reading temperature signals indicative of the fuel cell stack temperature from said at least one temperature sensor;
bypassing said heat radiation unit in said coolant transport circuit by operating at least one valve in said coolant transport circuit to allow the coolant medium to flow to said heater and to stop the coolant medium flow to said heat radiation unit upon receiving temperature signals from said at least one sensor indicating that the fuel cell stack is below a first predetermined value T1,
connecting electric power generated by said fuel cell stack to said PTC heater upon receiving temperature signals from said at least one sensor indicating that the fuel cell stack is below the first predetermined value T1, and
upon receiving temperature signals from said at least one sensor indicating that the fuel cell stack or the coolant has reached a predetermined second T2, a third T3 and a fourth T4 temperature, wherein $T2 \leq T3 \leq T4$,
connecting electric power generated by said fuel cell stack to a power output for external consumption at T2,
disconnecting said PTC heater from said electric power at T3, and
connecting said heat radiation unit to said coolant transport circuit by operating at least one valve that directs the coolant medium flow to said heat radiation unit at T4.

3. An apparatus comprising a fuel cell stack for converting chemical energy of a fuel containing hydrogen into electricity, at least one processing core, at least one memory device having instructions stored thereon which, when executed by a processor, cause the processor within the apparatus to perform operations in response to a startup condition of said fuel cell stack at least to:
read from at least one temperature sensor temperature signals indicative of the temperature of said fuel cell stack; and
bypass a heat radiation unit from a coolant transport circuit for said fuel cell stack by operating at least one valve in said coolant transport circuit to allow a coolant medium to flow to a PTC heater connected to said coolant transport circuit for heating said coolant medium circulating through said fuel cell stack and to stop flow of the coolant medium to said heat radiation unit and connect electric power generated by said fuel cell stack to said PTC heater upon receiving temperature signals from at least one sensor indicating that the fuel cell stack is below a first predetermined value T1, and upon receiving temperature signals from said at least one sensor indicating that the fuel cell stack or the coolant medium has reached a predetermined second T2, a third T3, and a fourth T4 temperature, wherein $T2 \leq T3 \leq T4$, to
connect electric power generated by said fuel cell stack to a power output for external consumption at T2,
disconnect said PTC heater from said electric power at T3, and
connect said heat radiation unit to said coolant transport circuit by operating at least one valve that directs the coolant medium flow to said heat radiation unit at T4.

* * * * *